Oct. 3, 1967     D. A. HILDEBRAND     3,345,585
PHASE SHIFTING STRIPLINE DIRECTIONAL COUPLING NETWORKS
Filed Nov. 25, 1964     6 Sheets-Sheet 1

INVENTOR.
DONALD A. HILDEBRAND
BY Harry A. Herbert Jr
and George Line
ATTORNEYS

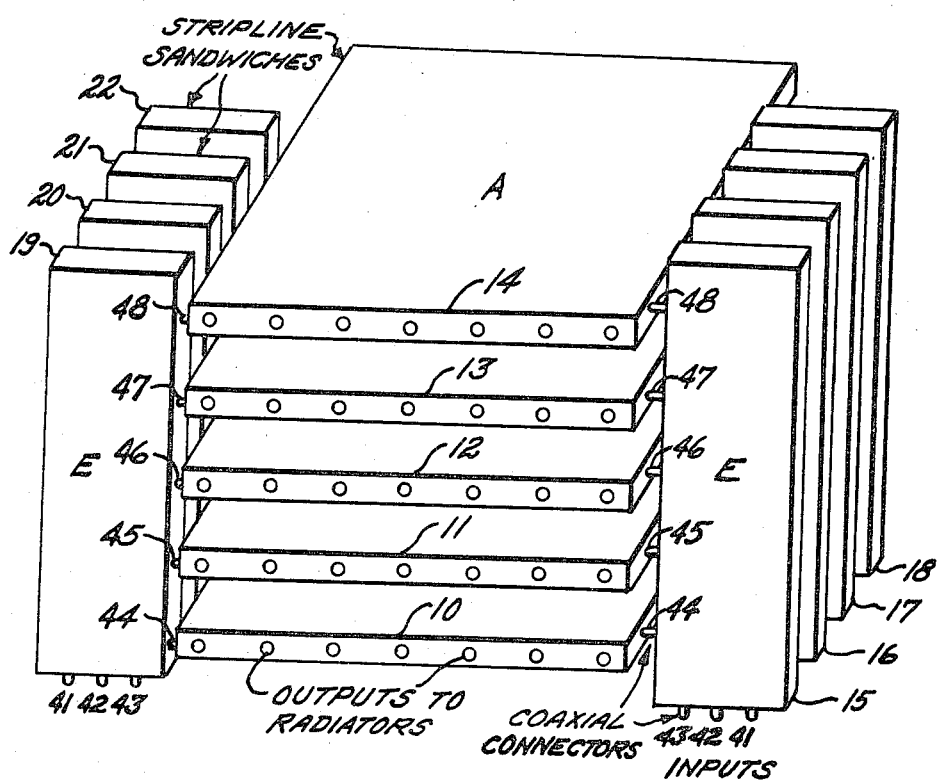

United States Patent Office 3,345,585
Patented Oct. 3, 1967

3,345,585
PHASE SHIFTING STRIPLINE DIRECTIONAL COUPLING NETWORKS
Donald A. Hildebrand, Rome, N.Y., assignor to the United States of America as represented by the Secretary of the Air Force
Filed Nov. 25, 1964, Ser. No. 414,034
7 Claims. (Cl. 333—10)

ABSTRACT OF THE DISCLOSURE

A stripline directional coupler network which allows independent center conductors to cross and which only require two ground planes. The network has a multiplicity of outputs serially excited by one or more inputs in such a way that the relative phase and the amplitudes at the outputs can be controlled by a choice of input. The networks can be interconnected to provide a passive multiple beam forming network for a two-dimensional array of radiators.

The invention described herein may be manufactured and used by or for the United States Government for governmental purposes without payment to me of any royalty thereon.

This invention relates to radio frequency (R-F) transmission lines and more particularly to flat strip or sandwich type R-F transmission lines.

The principles of operation of strip transmission lines (usually called sandwich line or stripline) are well known. Stripline R-F circuit components are frequently used in radio and radar gear to reduce the size and complexity of receivers and transmitters. Typical stripline components are: power dividers, band pass and band elimination filters, attenuators, directional couplers, stub tuners and impedance transformers.

The subject of this invetnion is a unique stripline directional coupler. There are several well-known forms of directional couplers. One form uses a single stripline sandwich, while another requires two sandwiches. The single-sandwich forms do not permit the center conductors to cross. The double-sandwich forms do allow two lines to cross, but require accurate fabrication and assembly to insure proper hole registration, and the edges of the assembly must be shielded to prevent radiation caused by the holes in the ground planes.

It is, therefore, an object of the present invention to provide a stripline directional coupler that will allow two independent center conductors to cross without producing serious radiation from the edges of the assembled sandwich, and which requires only two ground planes, thus producing a thinner, lighter, more easily made crossed-line coupler than presently used designs.

It is a further object of the invention to provide a compact stripline transmission line network having a multiplicity of output ports serially excited by one or more input ports in such a way that the relative phase and amplitude at the outputs can be controlled by choice of input port.

It is still a further object of the invention to provide a three-dimensional stripline network having a two-dimensional array of input and output ports such that the several inputs control the relative phase and amplitude in both dimensions of the array of output ports.

In the accompanying specification, I shall describe, and in the annexed drawings, show what is at present considered preferred embodiments of my present invention. It is, however, to be clearly understood that I do not wish to be limited to the exact details herein shown and described as they are for purposes of illustration only, inasmuch as changes therein may be made without the exercise of invention and within the true spirit and scope of the claims hereto appended.

In said drawings:

FIGURE 7 shows a passive multiple beam forming network for a two-dimensional array of antennas.

There are well-known stripline directional coupler types such as branch line coupler, hybrid ring coupler, and adjacent lines directional coupler, respectively. Each of these couplers is made using a single stripline sandwich. The single-sandwich forms do not permit the center conductors to cross.

There are well-known stripline directional coupler types such as Bethe-hole coupler and multihole coupler, respectively. The double-sandwich forms do allow two lines to cross, but require accurate fabrication and assembly to insure proper hole registration, and the edges of the assembly must be shielded to prevent radiation caused by the holes in the ground planes.

Figure 1:
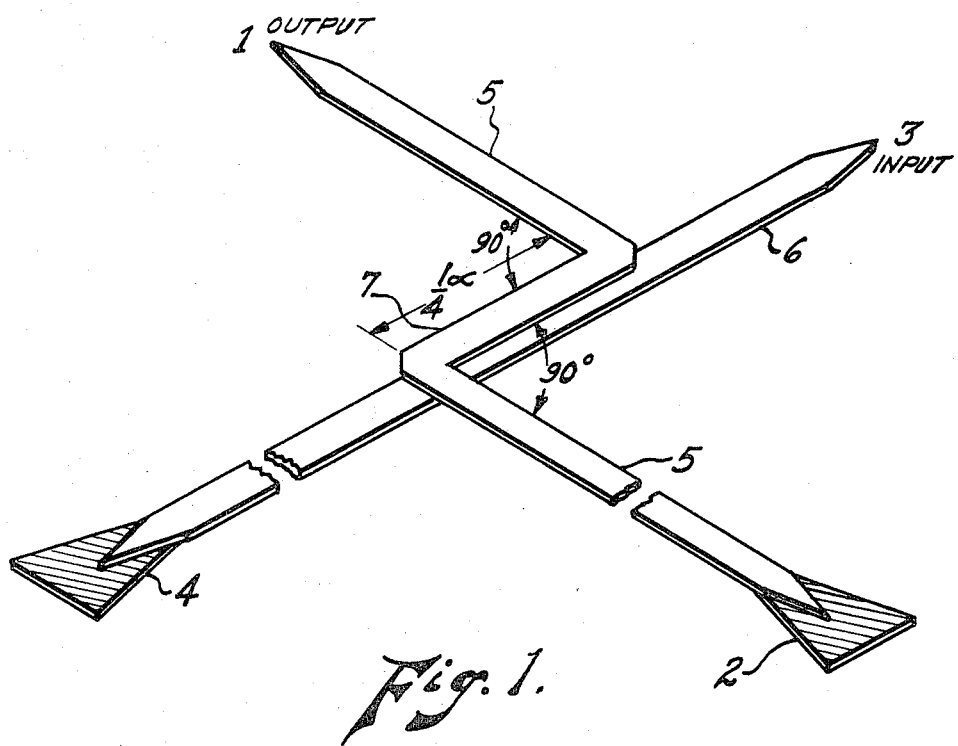
FIGURE 1 shows the basic stripline coupling element of the present invention.

An individual coupling element of the present invention is shown in FIGURE 1. The drawing shows the center conductors only, the usual ground planes having been omitted for clarity. The construction and operation of the basic element is as follows:

One center conductor 6, is a flat straight strip having an input terminal 3, and a load terminal 4. The second center conductor 5, is also a flat strip, but is bent in the plane of the strip at two places, as shown. It also has an output terminal 1, and a load terminal 2. The portion 7, of the second conductor between bends is placed directly above the first or input conductor, and is separated or insulated from it by a small space.

The coupling portion 7, of the output line 5, is made one-quarter or odd multiples of one-quarter guide wavelength ($\lambda_g$) long. The guide wavelength is determined by the frequency ($f$) of the source of R-F energy being used, and the relative dielectric constant ($E_r$) of the material surrounding the center conductors, according to the relation $$\lambda_g = \frac{c}{f\sqrt{E_r}} \quad (1)$$

where $c$=velocity of light.

The source of R-F energy is conducted to the input terminal 3, of the input line 6. The R-F energy propagates down the line in the form of a transverse electromagnetic (TEM) wave. As this wave travels under the coupling portion 7, of the output line 5, a fraction of its energy is coupled upward into the output line and travels toward the right, appearing at the output terminal 1. The amount of energy coupled onto the output line is determined by the width of the conductors in the coupling region and by the separation of the conductors in this region. The energy in the output line lags in phase by 90° that energy remaining on the input line.

This directional coupler permits crossing the center conductors without requiring a ground plane with coupling holes between them. A complete coupled thus requires only two ground planes and can be made as a single sandwich, as compared to the four ground plane, two sandwich structures.

Figure 2:
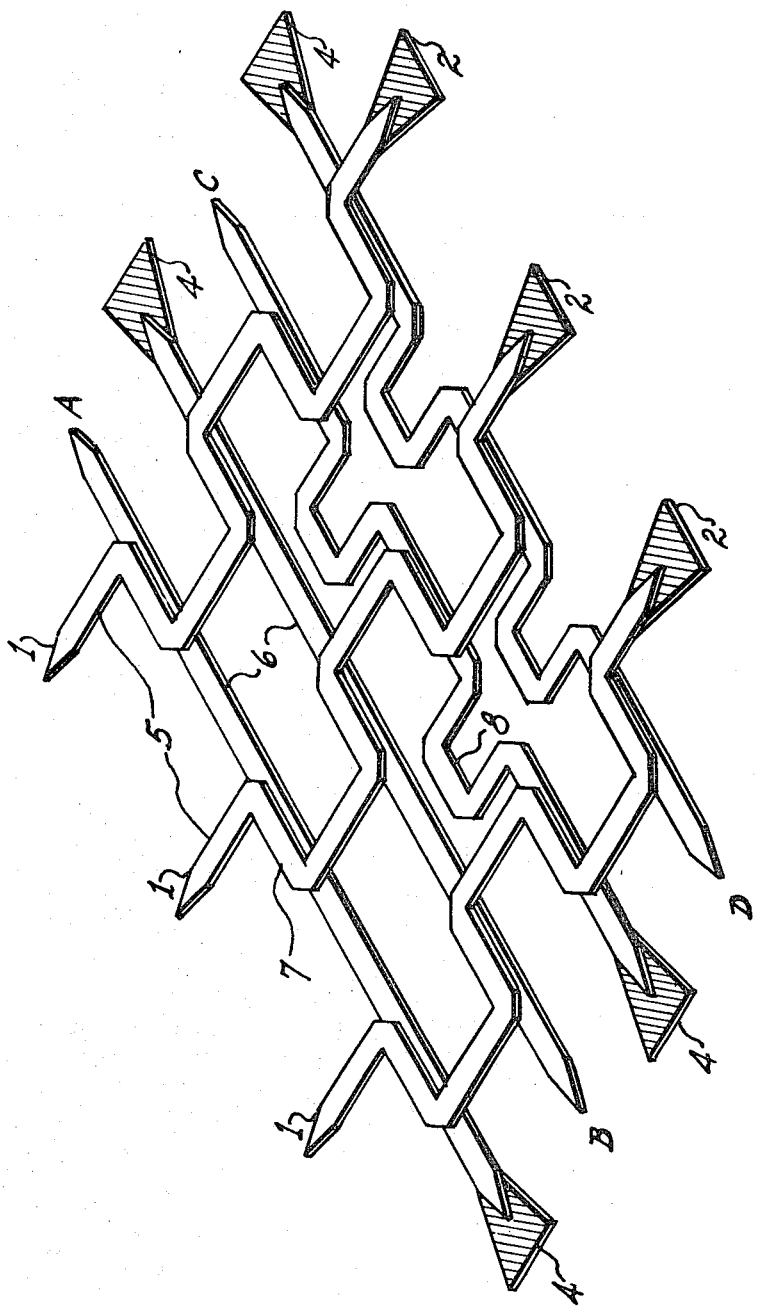
FIGURE 2 shows a network of couplers of this invention.
Figure 3:
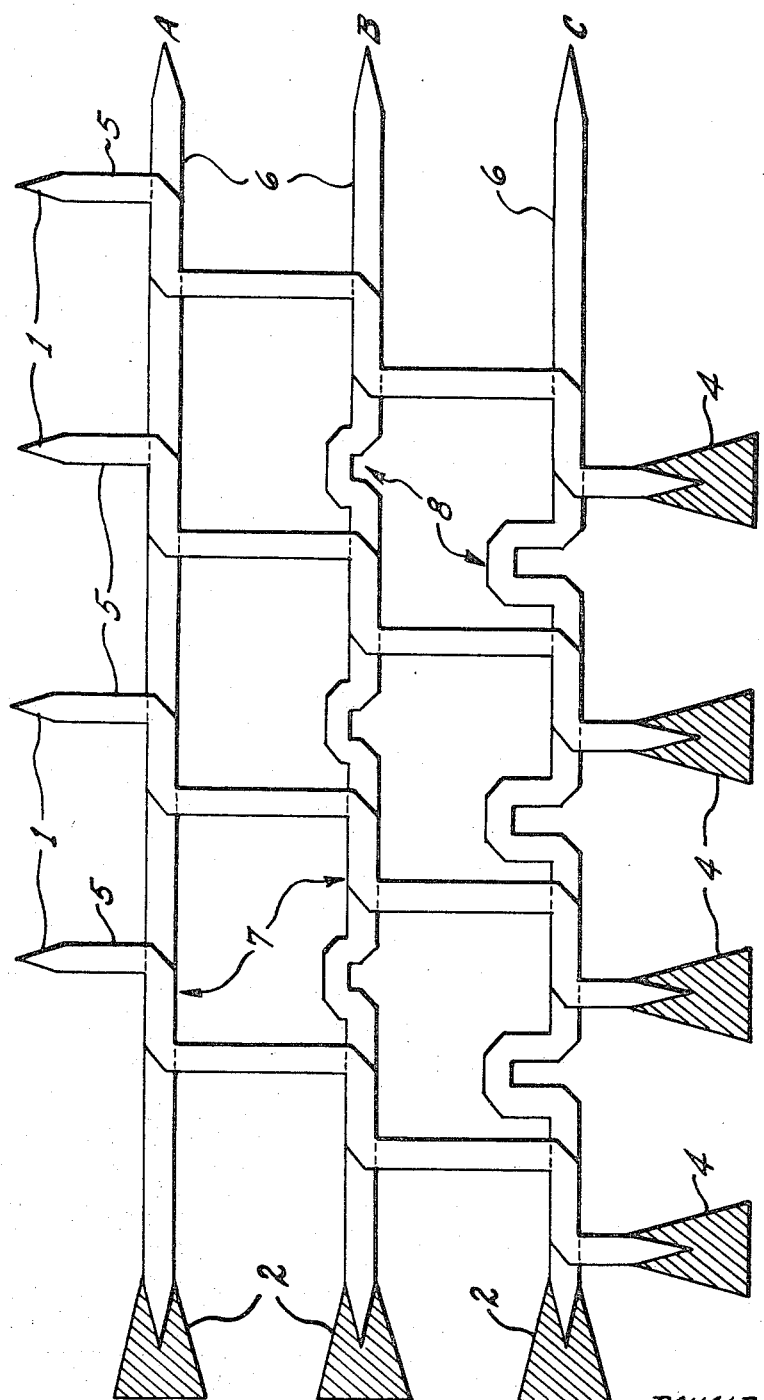
FIGURE 3 shows another network of couplers.

By judicious interconnection of several of the basic elements described above, it is possible to form either of the networks shown in FIGURES 2 and 3. Again, the ground planes have been omitted for clarity.

In FIGURE 3, the output lines 5, are bent into a stepped pattern, are uniformly spaced, and are so arranged that the output terminals 1, and coupling sections 7, lie along straight lines. A number of input lines 6, are placed beneath the coupling regions so that they serially connect the appropriate steps of all output lines. The input lines have input terminals A, B and C. Some of the input lines have bends or knees 8, between successive output lines. The purpose of these knees is to lengthen the input lines, thereby producing various relative phase shifts between successive output terminals.

If many outputs are required the area occupied by the network of FIGURE 3 is quite large. This area can be substantially reduced if the output lines are bent as shown in FIGURE 2. However, when this is done, the input terminals of successive input lines must alternate from one side to the other of the network. That is, the input A, of the first line is on the right, that of the second, B, is on he left, etc. This occurs because the couplers are directional and it is desired that all energy coupled onto the output lines appear at the output terminals rather than the load terminals.

The relative phase shift between signals appearing at successive output ports is determined by the length of conductor between successive ports. If the total of the distance from an output terminal to a coupling region and the distance along an input line between corresponding points on successive coupling regions is an integral number of wavelengths for all outputs, the energy appearing at one output will be electrically in phase with the energy appearing at any other output, when a R-F source is connected to the input. The output signals will not be in time phase since the outputs are serially connected along an input line.

If the line length between successive outputs is not an integral number of wavelengths, the outputs will not be in phase. Referring to FIGURE 2, consider a R-F source connected to input line 6A. Taking the energy appearing at the first output on the right as a phase reference, the energy appearing at the second output will lag or lead that of the first by $\phi$ degrees. With equally spaced outputs, the signal of the third output will lag or lead the first by $2\phi$ degrees and so forth. Thus, a skewed phase front is produced across the outputs.

The phase difference, $\phi$, between successive outputs is related to the electrical length of input line between successive coupling regions by the equation:

$$\phi = \frac{360L}{\lambda_g} \text{ degrees} \qquad (2)$$

where $L$=physical input line length between successive coupling regions.

The angle which the output phase front makes with the line containing the output ports is related to $\phi$ by the equation:

$$\phi = kd \sin \theta \qquad (3)$$

where:

$\theta$=angle the phase front makes with line of output ports
$d$=physical separation of output ports, usually $\cong \cdot 5\lambda_o$
$k$=wave number=$2\pi/\lambda_o$
$\lambda_o$=free-space wavelength of R-F source energy=$c/f$.

Also, the guide wavelength, $\lambda_g$, is related to the free-space wavelength $\lambda_o$, by:

$$\lambda_g = \frac{\lambda_o}{\mu_r E_r} \qquad (4)$$

where:

$\mu_r$=permeability of material surrounding center conductors, relative to air
$E_r$=relative dielectric constant of this same material.

By combining Equations 2 and 3 to give $$\frac{360L}{\lambda_g} = kd \sin \theta$$

and solving for L, we obtain $$L = \frac{\lambda_g}{\lambda_o} d \sin \theta \qquad (5)$$

which permits the determination of the input feedline length between successive coupling regions that is required produce an output phase front skewed at a given angle, $\theta$, to the line of output ports. For this derivation it was assumed that the length of the output line from the terminal 1, to the coupling region 7, in any one row of couplers is the same for all output lines.

Figure 4:
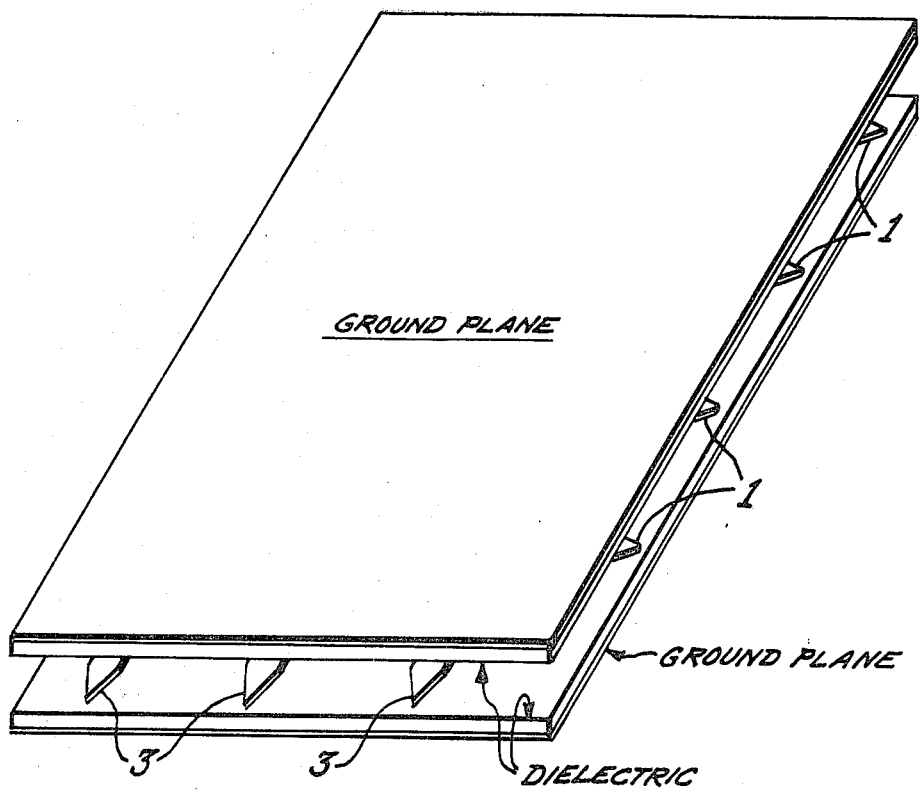
FIGURE 4 shows a stripline sandwich wherein the center conductor networks in FIGURES 2 through 4 are placed between two ground planes.

The center conductor networks in FIGURES 1 through 3 are placed between two ground planes to form a stripline sandwich, as shown in FIGURE 4. The center conductors can be supported in several ways, two of which are shown in FIGURES 5 and 6.

Figure 5:
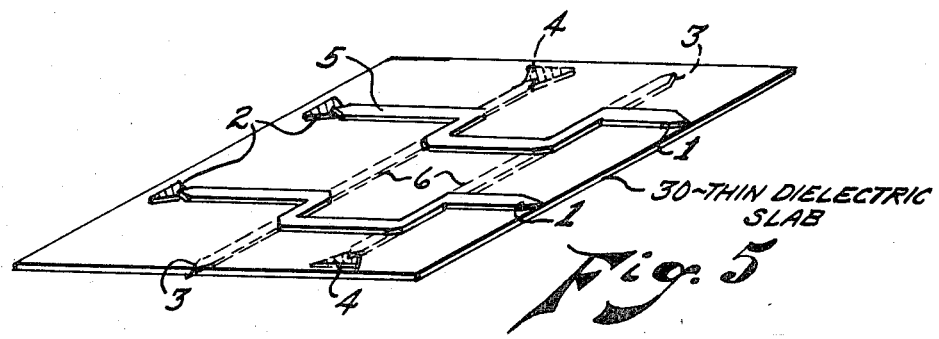
FIGURE 5 shows one technique for supporting the center conductors.

In FIGURE 5, the input and output lines are bonded to opposite sides of a single thin dielectric sheet 30. This sheet is then sandwiched between two ground planes, which are spaced according to characteristic impedance requirements by additional dielectric sheets or other supports.

Figure 6:
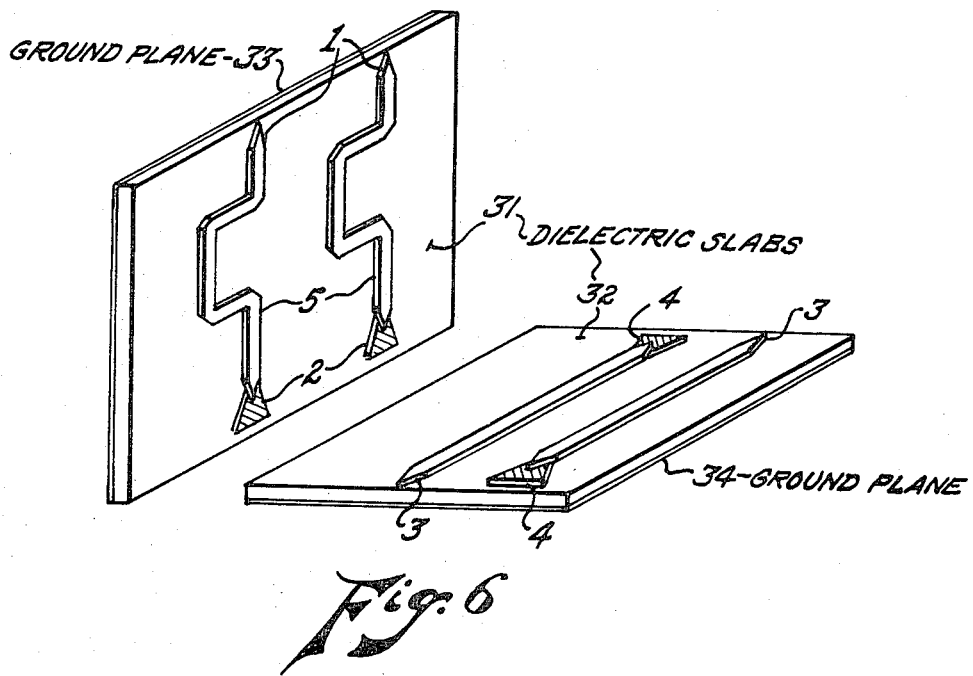
FIGURE 6 shows a second technique for supporting the center conductors.

In FIGURE 6, the input and output lines are bonded to separate dielectric sheets 31 and 32. Ground planes 33 and 34 are bonded to the other sides of these sheets 31 and 32, respectively, which are then fastened together with suitable insulation or spacing between the overlapping center conductors. Conventional coaxial-line fittings can be attached to the input and output terminals. It is also possible to attach waveguide fittings, though the transition is much harder to accomplish.

A single stripline sandwich such as those shown in FIGURES 4, 5 and 6 may be used in several ways. One possible use is as a tapped delay line providing a multiplicity of phase shifts between outputs. The number of different phase shifts available is, usually, the same as the number of input lines. This system offers the advantage of mechanical simplicity and capability of rapidly changing the output phase distribution by connecting a R-F source to different inputs through a suitable switch.

This network might also be used as a power divider feeding a linear array of radiators. The linear array could be used as an antenna, or it could be used as a line source illuminating a parabolic cylinder. Again, a suitable switch used with the stripline network could provide the capability of steering the resultant beam of R-F energy in the plane of the array.

Several stripline sandwiches suitably stacked and interconnected would provide a mechanically simple, easily fabricated, passive mutliple beam forming network for a two-dimensional array of radiators. One such arrangement is shown in FIGURE 7.

Call the stack of five horizontal sandwiches 10–14 the azimuth package. All sandwiches in this stack have identical center conductor patterns, similar to that of FIGURE 3. There are four inputs on each side of each sandwich. Each input port corresponds to a separate azimuth output wavefront, or eight possible azimuth positions.

The eight columns of azimuth inputs are connected to the outputs of the vertical sandwiches, as shown. All of the vertical sandwiches 15–22 have the same center conductor pattern, similar to that of FIGURE 3. Each of these sandwiches has three inputs and five outputs. For example, sandwiches 19–20 have inputs 41–43, respectively, and outputs 44–48.

A R-F source connected to one of the elevation inputs will excite a column of five inputs to the azimuth package with a phase shift between azimuth sandwiches determined by the design of the elevation sandwiches. It is therefore possible to produce 24 separate output phase fronts or 24 separate beam positions, eight in azimuth and three in elevation. It is possible to excite more than one input at a time by using a power divider between the R-F source and the inputs to the beam forming network.

It should be noted that only two different phasing networks are required for this array, one for azimuth and one for elevation. Once master artwork is prepared for these two networks, as many sandwiches as required can be made using state-of-the-art photographic methods. Also, if the azimuth sandwiches have a center conductor pattern similar to that in FIGURE 3, all elevation sandwiches can be put on one side of the azimuth package.

While various changes may be made in the detail construction of any of the networks discussed above, it shall be understood that such changes will be within the spirit and scope of the present invention as defined by the claims.

What is claimed is:

1. A directional coupler network system comprising a first set of successive center conductors in the form of flat striplines occupying a first plane, said first set including preselected center conductors having bends therein for lengthening purposes to produce various phase shifts, each of said flat strips having input and load terminals, each of said input terminals being adapted to receive radio frequency energy to be coupled, a second set of successive center conductors also in the form of flat striplines, each having output and load terminals and also having a preselected portion coincident with each of said striplines of said first set, each of said portions being odd multiples of one-quarter guide wavelength long and formed by bending said stripline at 90° at two preselected points in the plane thereof, means to position said first set a predetermined distance from said second set with each of said portions being above and parallel to its associated stripline of said first set, said predetermined positioning operating to couple said radio frequency energy from said first set to said second set in a predetermined direction to provide signals at all of said output terminals with any one of said input terminals receiving said radio frequency energy and also providing a change of relative phase shift between the signals appearing at the successive output terminals by connecting the source of said radio frequency energy to a different input terminal, and a first and second ground plane with said first and second sets being interposed therebetween.

2. A directional coupler network such as defined in claim 1 wherein all of said input terminals are positioned on the same side of said network.

3. A directional coupler network such as defined in calim 1 wherein all of said output terminals are positioned on the same side of said network.

4. A directional coupler network such as defined in claim 1 wherein said network has four sides, one side including all of said input terminals, and another side including all of said output terminals.

5. A directional coupler network such as defined in claim 1 wherein said network has four sides, a first side including all of said input terminals, a second side including all of said output terminals, a third side including all of said load terminals associated with said output terminals, and a fourth side including all of said load terminals associated with said input terminals.

6. A directional coupler network such as defined in claim 1 with input terminals being successive and alternate from one side of said network to the opposite side thereof.

7. A two-dimensional phasing system utilizing a combination of groups of directional coupler networks comprising a first, second and third group of directional coupler networks, each network of said first, second and third groups including a first set of successive center conductors in the form of flat striplines occupying a first plane, said first set having preselected center conductors with bends therein for lengthening purposes to produce predetermined phase shifts, each of said flat strips having an input terminal and load, said input terminals being adapted to receive radio frequency energy to be coupled, a second set of successive center conductors also in the form of flat striplines, each having an output terminal and load and also having a preselected portion associated with each of said striplines of said first set, each of said portions being odd multiples of one-quarter guide wavelength long and formed by bending said stripline at 90° at two preselected points in the plane thereof, means to position said first set of said second group in a second plane at a predetermined distance from said first plane with each of said portions being above and parallel to its associated stripline of said first set, said predetermined positoining operating to couple said radio frequency energy from said first set to said second set in a predetermined direction to provide signals at all of said output terminals with any one of said input terminals receiving said radio frequency energy and also providing a change of relative phase shift between the signals appearing at successive output terminals by connecting the source of said radio frequency energy to a different input terminal, first and second group planes with said first and second sets interposed therebetween, each network of said first and third group having all of said input terminals located on one preselected side and all output terminals on another preselected side, each network of said second group having said input terminals alternate from one preselected side to the opposite side thereof and all output terminals located at another preselected side thereof, said first and third group being stacked vertically, said second group stacked horizontally and interposed between said first and third group, means to connect the output terminals of said first vertical group to the input terminals on one side of said second horizontal group, and means to connect the output terminals of said third vertical group to the input terminals on the opposite side of said second horizontal group, said first and third group coacting with said second group such that both the horizontal and vertical angles which a planar output phase front makes with the plane containing said output terminals of said second group are controlled by the selection of a predetermined input terminal of said input terminals of said first and third group.

References Cited

UNITED STATES PATENTS

| | | | |
|---|---|---|---|
| 3,016,531 | 1/1962 | Tomiyasu et al. | 343—779 X |
| 3,176,297 | 3/1965 | Forsberg | 343—854 X |
| 3,278,864 | 10/1966 | Butler | 333—10 |

HERMAN KARL SAALBACH, *Primary Examiner.*

ELI LIEBERMAN, *Examiner.*

R. COHN, *Assistant Examiner.*